Fig. 1.

April 28, 1936.   E. BREITLING   2,039,143
TOTALIZER CONTROLLING MECHANISM
Filed May 8, 1923   7 Sheets-Sheet 2

Inventor
Ernst Breitling
by Knight Bros
attys

April 28, 1936.  E. BREITLING  2,039,143
TOTALIZER CONTROLLING MECHANISM
Filed May 8, 1928  7 Sheets-Sheet 4

ERNST BREITLING
Inventor
By Knight Bros
Attorneys

Patented Apr. 28, 1936

2,039,143

UNITED STATES PATENT OFFICE 2,039,143

TOTALIZER CONTROLLING MECHANISM

Ernst Breitling, Essen, Germany, assignor, by mesne assignments, to The National Cash Register Co., Dayton, Ohio, a corporation of Maryland Application May 8, 1928, Serial No. 276,151 In Germany June 22, 1927

31 Claims. (Cl. 235—7)

This invention relates to totalizer selecting and engaging mechanism wherein the time of engagement and disengagement of the totalizers with the differential members is varied to perform different types of operations such as adding, sub-totaling and totaling. The disclosure shows manually operated keys and levers for controlling the machine during these operations, and, while such devices have heretofore been used for this purpose, the mechanism forming the subject-matter of the present invention is illustrative of an extremely simple adaptation thereof.

In the present construction the totalizer wheels are brought into engagement with the actuating mechanism by rotation of a Geneva wheel that is selectively positioned to engage differential and locking disks used in performing the different types of operations.

In order to permit my invention to be more easily understood, a preferred embodiment of the same is illustrated in the drawings which accompany and form a part of this specification, and which show a cash register having a plurality of rows of interspersed totalizers.

Figure 1:
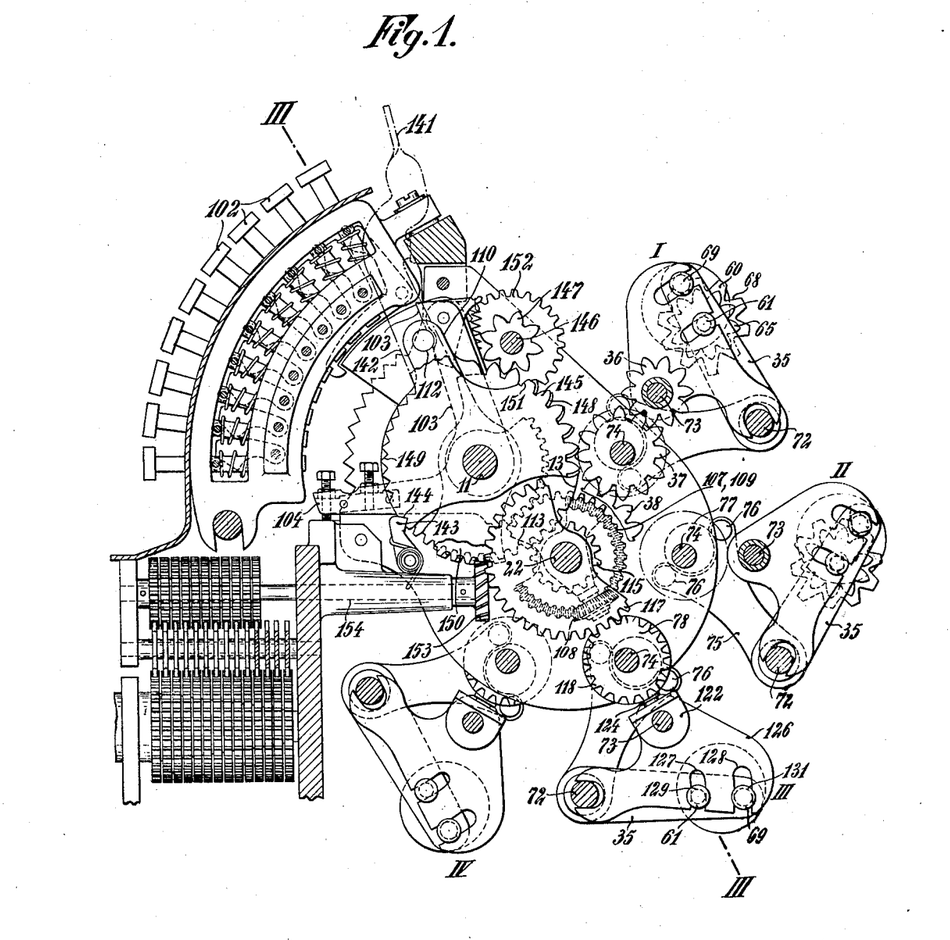
Figure 1 is a side view of the mechanism.
Figure 4:
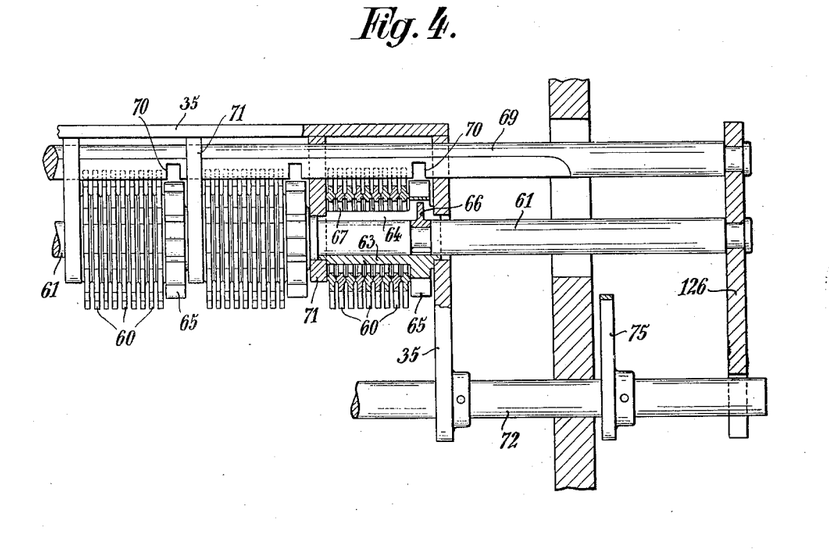
Figure 4 is a view, partly in section, of a portion of one of the rows of totalizers in enlarged scale.

Referring now to these figures, I, II, III and IV denote rows of totalizers which are concentrically arranged about a shaft 22, (Fig. 1). Each totalizer row (Fig. 4) comprises nine totalizers, the wheels 60 of which are arranged concentrically with a rider axle 61. The wheels 60 of the units order of all the totalizers of one row lie adjacent one another in the usual manner and are mounted on a sleeve 63. The same is true with the wheels 60 of the higher orders. Each sleeve 63 has a longitudinal groove 64 and carries a differential wheel 65. The longitudinal grooves 64 are engaged by riders 66 rotatably but non-shiftably mounted on the rider axle 61. When the latter is shifted, the riders 66 engage internal teeth 67 of the wheels 60 and couple the latter with the sleeves 63 and thereby with the differential wheels 65. Each rider 66 comprises a portion engaged in a circumferential recess of shaft 61, and a nose portion engaged in a slot 64 in the sleeve 63. By this arrangement of parts, a lateral shifting of shaft 61 will connect one of the totalizer wheels 60 with the respective differential wheel 65. Furthermore, a locking bar 69 is shifted with the rider axle 61, which bar engages locking grooves 68 (Fig. 1) of the counting wheels 60 and releases, by means of gaps 70 (Fig. 4), the counting wheels to be actuated by the rider.

The sleeves 63 are supported by the walls 71 of a frame 35 mounted on a shaft 72 rotatably but non-shiftably mounted in the machine frame. By rocking frame 35, the differential wheels 65 (Fig. 1) engage pinions 36 mounted on shaft 73, which pinions are permanently in mesh, through the intermediate wheels 37 mounted on shafts 74, with a common main differential wheel 38 loose on shaft 22. The main differential wheel 38 is rotated by oscillation of shaft 22 in the manner disclosed in applicant's U. S. Patent No. 1,792,569, issued on February 17, 1931, according to the values set on the amount keys at the beginning of an operation. After the selected totalizers have been engaged, the differential wheel 38 is returned to initial position, the value set up on the keyboard being entered on the engaged totalizers by means of the parts 37, 36, 65, 63 and 66.

The hereinafter described arrangement is provided to shift the rider axle 61 and the locking bar 69 to select the individual totalizers of a row.

A key bank comprising nine keys 102 (Figs. 1 and 3) is provided for each of the totalizer rows I, II, III, IV, each key 102 being capable of selecting a particular totalizer which is thrown into gear during the operation of the machine. The keys 102 co-operate with a differential member 103 (Fig. 1) and an auxiliary differential member 104 actuated complementarily thereto by a differential gear, as fully disclosed in the above mentioned patent. The two differential members 103 and 104 are pivoted on shaft 11 and are connected, by teeth 105 and 106, respectively, with a bevelled gear 107 and a bevelled pinion 108 of the differential mechanism. A bevelled gear 109, constituting the third element of the differential mechanism is rigidly mounted on shaft 22.

Figure 3:
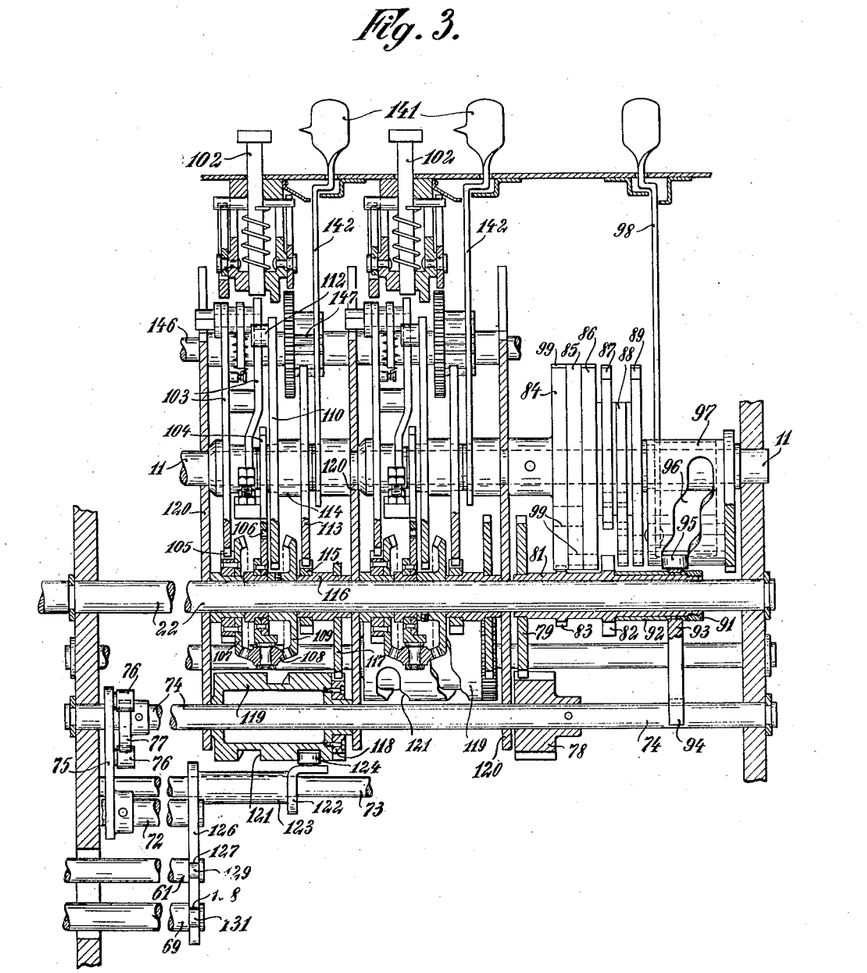
Figure 3 is a section on line III—III of Figures 1 and 2.

At the beginning of a machine operation a partial rotation is imparted to shaft 22, as also disclosed in the above mentioned patent. When this takes place, the two differential members 103 and 104 move toward the foot of the depressed key 102 (Fig. 1) by the action of the differential gearing 107 to 109. A disk 110 is loosely mounted on shaft 11 and carries a stud 112 projecting into the path of the two differential members 103 and 104. When set, the differential members 103 and 104 embrace the stud 112 and set it in line with the depressed key. The rotation of the disk 110 thereby induced is transmitted to a toothed wheel 113 (Fig. 3) rigidly connected with disk 110 by a hub 114. From this wheel 113 the rotation is transmitted, through a pinion 115 loose on shaft 22, to a toothed segment 117 rigidly connected to pinion 115 by a hub 116. The segment 117 is in mesh with a pinion 118 (Figs. 1 and 3) secured to one end of a drum 119 rotatably but non-shiftably mounted between partitions 120. It will be understood that there is one of these drums for each bank of keys 102 and its respective row of totalizers. A helical stepped groove 121 having ten steps is cut in the circumferential surface of this drum. This stepped groove 121 is engaged by a roller 124 mounted on an extension 122 of a sleeve 123 slidably mounted on the shaft 73. On its other end, the sleeve 123 carries a plate 126 which embraces the shaft 72, Figure 1, and thereby prevents the sleeve 123 from rotating about shaft 73. The plate 126 has open slots 127, 128 engaging annular grooves 129, 131, Figure 3, provided, respectively, on the right-hand end of the rider axle 61 and on the locking bar 69. By this engagement, these two members 61 and 69 take part in the lateral shifting motion of sleeve 123 caused by rotation of the drum 119. When no key 102 has been depressed for an operation of the machine, the rider axle 61 is adjusted into the position illustrated in Figure 4, in which the riders 66 are out of mesh with the totalizer wheels 60, the appurtenant roller 124 engaging the first step from the right, Figure 3, of the stepped groove 121. The other nine positions of the rider axle correspond to the nine keys of the appurtenant bank of keys 102. It is apparent that a shifting of the rider axle 61 from its old position immediately into the new one takes place without an intermediate return to the idle position. The provision of a special idle position of the rider axle enables the use of a single differential member (wheel 79) for engaging the totalizers, so that although all four rows of totalizers are engaged at once by this member, the value introduced by the differential wheel 38 (Fig. 1) need not be entered on a totalizer in every row, inasmuch as the rider on the non-selected totalizer will not transmit its motion to any of the counting wheels 60 upon the differential wheel being rotated by the main differential wheel 38.

For "addition" operations it is possible to shift the selected totalizer into alignment during the operation, since the selected totalizers are not engaged until after the forward stroke of the differentials is completed.

However, for "total" and "sub-total" operations, the totalizer involved must be engaged before the differentials begin their forward movement, which makes it necessary to either run the machine through a preliminary operation to select the totalizer, or to provide other mechanism for this purpose.

The present invention does not resort to this preliminary operation, but provides a simple means for selecting the desired totalizer by hand before the operation is started. This mechanism will now be explained.

Figure 8:
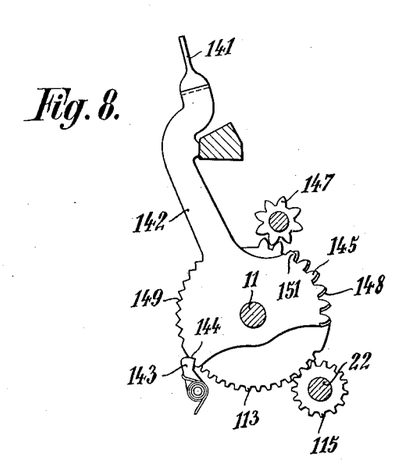
Figure 8 shows a detail of the mechanism shown in Fig. 1.

An adjusting lever 142 (Figs. 1, 3 and 8), having a handle 141, is pivoted on shaft 11 beside each row of keys 102, which levers are resiliently held in their positions of rest illustrated in Figures 1 and 8 by spring pressed pawls 143, that engage notches 144 on levers 142. Each lever carries a series of teeth 145 intended to co-operate with a pinion 147 mounted on a shaft 146. The pinion 147 is permanently in mesh with a series of teeth 148 on the above-described toothed wheel 113, which is rigidly connected to the disk 110 (Fig. 3), and is connected with the drum 119 that produces the lateral shift of its rider axle 61.

When the adjusting lever 142 is rocked out of its position of rest, the teeth 145 (Figs. 1 and 8) engage the pinion 147 and turn it, together with the drum 119, an amount corresponding to the movement of lever 142. When lever 142 stands beside the uppermost key 102, then the first totalizer from the right (Fig. 4) is selected. When it stands beside the second key from the top, the second totalizer from the right is selected, and so on. A series of locking teeth 149 (Figs. 1 and 8), cooperating with pawl 143, resiliently holds the lever 142 in its adjusted position. In this manner the totalizers are selected by the adjustment of the levers 142 preparatory to a machine operation. Since the keys 102 are not used in taking totals, a special detent means (not shown) is provided to prevent them from being depressed during these operations. The keys 102 do, however, serve as a guide for the adjustment for the levers 142.

During a total-taking operation the differential members 103 and 104 exercise no control over the selection of the totalizers, although they are actuated in the usual manner by the shaft 22. During these operations the members 103 and 104 move so as to embrace the pin 112 in whatever position it is left after adjustment of the lever 142.

The first tooth 151 of the series of teeth 145 (Figs. 1 and 8) is somewhat shorter than the remaining ones to insure a smooth meshing with the pinion 147. It is obvious that a correct selection of a totalizer by the lever 142 requires that the disk 110 be in its uppermost or home position, illustrated in Figure 1, before the lever is moved to engage the teeth 145 with the pinion 147. To accomplish this, the machine is given an idle operation with no keys 102 depressed, which returns the disks 110 home from whatever positions they assumed at the end of the preceding operation.

It is necessary, however, to perform such an idle operation only prior to the first of a series of successive totaling operations, since the disks 110 and pinions 147 remain in correct alignment with the teeth 145 until the keys 102 are again used to select a totalizer for an adding operation.

This form of mechanism has the advantage of requiring only one machine cycle to perform a totaling operation, and needs an idle operation only in connection with the first of a series of such operations, which are manually performed at the close of a business day.

The disk 110 is in connection with an appropriate indicator wheel (not shown) through the wheel 113, pinion 147, and a pinion 152 rigidly secured thereto, and with the corresponding type wheel by a series of helical teeth 150 on the lower edge of the disk 110 meshing with a helical gear 153 secured to a shaft 154. The positioning of the indicator and type wheels is obviously effected, like the selection of the totalizers, during the operation of the machine in adding operations, and by a preliminary setting of adjusting levers 142 in total-taking operations.

Figure 2:
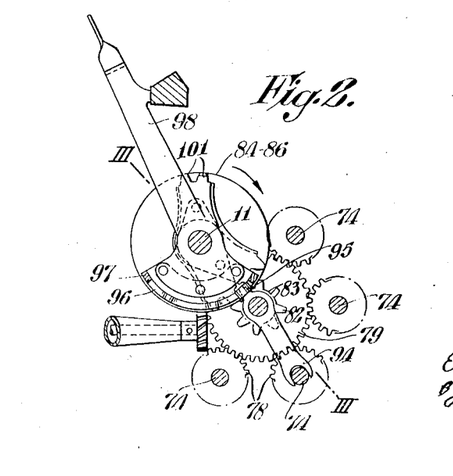
Figure 2 is a side view of the transaction selecting lever and of the parts immediately connected thereto.
Figure 2A:
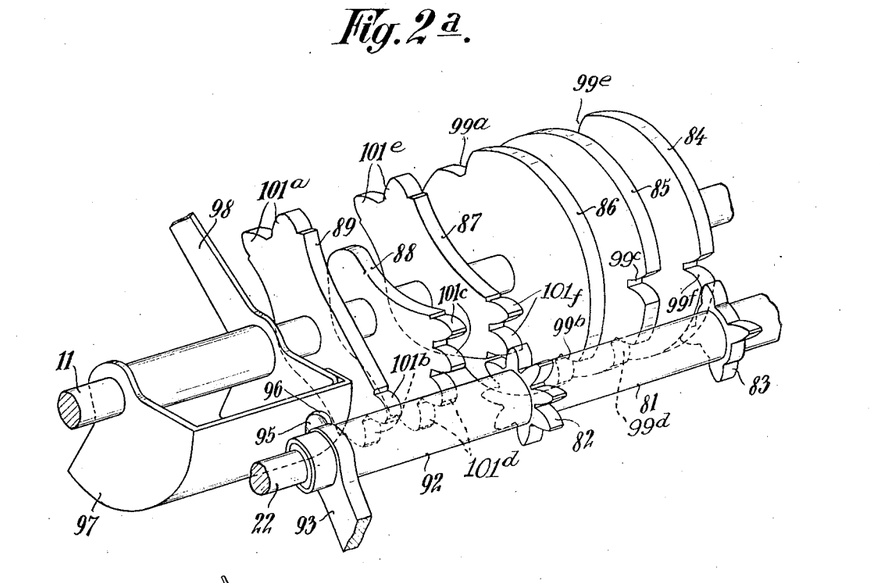
Figure 2a is a corresponding perspective view with certain parts in separated relation for clearness.

The rocking motion of the shaft 72 to engage the selected totalizers will now be described. Each shaft 72 has pinned thereto, on its left-hand end (Fig. 3), an arm 75 which carries two rollers 76 on one end thereof, engaging an eccentric disk 77 (Fig. 1) secured to the appurtenant shaft 74. Each shaft 74 has mounted on it a pinion 78 (Figs. 1, 2 and 3), all these pinions 78 being permanently in mesh with a wheel 79 (Fig. 2) rotatably and shiftably mounted on shaft 22 together with a sleeve 81 rigidly connected thereto (Figs. 2a and 3). The sleeve 81 acts as a mounting member on which is fixed an eight tooth pinion 82 and a four tooth pinion 83. The latter is formed from an eight tooth pinion by cutting out each second tooth thereof. Three locking disks 84, 85 and 86 rigid on a shaft 11 co-operate with pinion 83, while three actuating disks 87, 88 and 89, likewise rigid on shaft 11, co-operate with pinion 82.

A sleeve 92, Figure 3, is loosely mounted on sleeve 81 between pinion 82 and an end nut 91, which sleeve has fixed on it an arm 93 that embraces, with its bifurcated end 94, the shaft 74, while its other end carries a roller 95 engaging a stepped groove 96 of a segment 97 rotatably but non-shiftably mounted on shaft 11. The segment 97 is further rigidly connected with a manipulative lever 98 by which it may be moved to different angular positions that correspond to the operations of adding and the taking of totals and sub-totals. Upon lever 98 being adjusted, the sleeve 81 is shifted by the stepped groove 96, and the pinions 83 and 82 are set on two corresponding disks of sets 84 to 86 and 87 to 89. The pinion 78 is of such a width, that it remains in mesh with the spur wheel 79 in spite of sleeve 81 being shifted. The disks 84, 85 and 86 each have surfaces concentric with their axis adapted to enter any one of the inter-tooth gaps of pinion 83, whereby the latter and the sleeve 81, wheel 79 and pinion 82 are secured against rotation. As the diameter of wheel 79 is twice that of pinion 78, the eccentric disks 77 are turned 180 degrees on each partial rotation of sleeve 81. There are two such partial rotations during each operation of the machine, because each of the disks 87 to 89 has four teeth. Hence one complete revolution of the main shaft 11 in a clockwise direction (Figs. 2 and 2a), with the disks 84 to 89, causes one complete reciprocation of the arms 75 and thereby the engagement and disengagement of the totalizers with the intermediate wheels 36.

As stated above during each machine operation the differential wheel 38 at the commencement of said operation is rotated forward an amount corresponding to the amount values set up on the amount keys (not shown), and subsequently is rotated back to its initial position. This is the conventional operation in machines of this type. When an "addition" operation is to be performed, it is necessary that the totalizers be in engagement with the pinions 36 only during the return movement of the differential wheels 38, whereby an amount corresponding to that set up in said differential wheels during their forward movement is transmitted to the totalizers. When a "sub-total" operation is to be performed it is necessary that the totalizer be in engagement with the pinions 36 during both the forward and backward motion of the differential wheels 38 whereby the amount taken from the totalizer wheels and set up on the differential wheels 38 during their forward movement will be replaced on the totalizer wheels during the return movement. Thus the taking of a sub-total does not affect the final position of the totalizers. When a "totalizing" operation is to be performed it is necessary that the totalizer be in engagement with the pinions 36 only during the forward movement of the differential wheels 38, so that the latter can rotate the totalizer wheels to zero and leave them in this position.

The time of engagement of the totalizers is controlled by the mechanism associated with lever 98.

The instant at which this engagement and disengagement takes place differs according to which of the recesses 99 and teeth 101 are in operative position.

When the hand lever 98 is set on "Addition", the pinions 82 and 83 co-operate with the disks 89 and 86.

In this case the teeth 101a actuate pinion 82 to throw in the selected totalizers during the return movement of the differential wheels 38. After said return movement is completed the teeth 101b actuate pinion 82 to throw the totalizers out. Of course at the same time, the recesses 99a and 99b release the pinion 83, whereby the above movements can take place. When the hand lever 98 has been set to the "Sub-total" position, the pinions 83 and 82 are opposite the disks 85 and 88.

In this case the teeth 101c actuate the pinion 82 to cause the selected totalizer to be engaged during both the forward and backward motion of the differential wheels 38. The teeth 101d are placed so as to actuate the pinion 82 near the end of the travel of disk 88 so that the totalizer is not thrown out until the differential wheels 38 have completed their return movement. When finally, hand lever 98 has been set to the "totalizing" position, the pinions 83 and 82 are in the plane of the disks 84 and 87 (Fig. 3).

In this case the teeth 101f actuate the pinion 82 to cause the selected totalizer to be engaged during the forward motion of the differential wheels 38. Upon completion of the said forward motion the teeth 101e actuate the pinion 82 to disengage the totalizer for the return motion of the differential wheels 38.

In the position of rest of the machine the pinion 82 is completely free from the teeth 101 and pinion 83 is opposite an unbroken portion of the circumference of one of the disks 84 to 86, so that the sleeve 81 is free to be shifted without interference from the several gears and disks.

Figure 7:
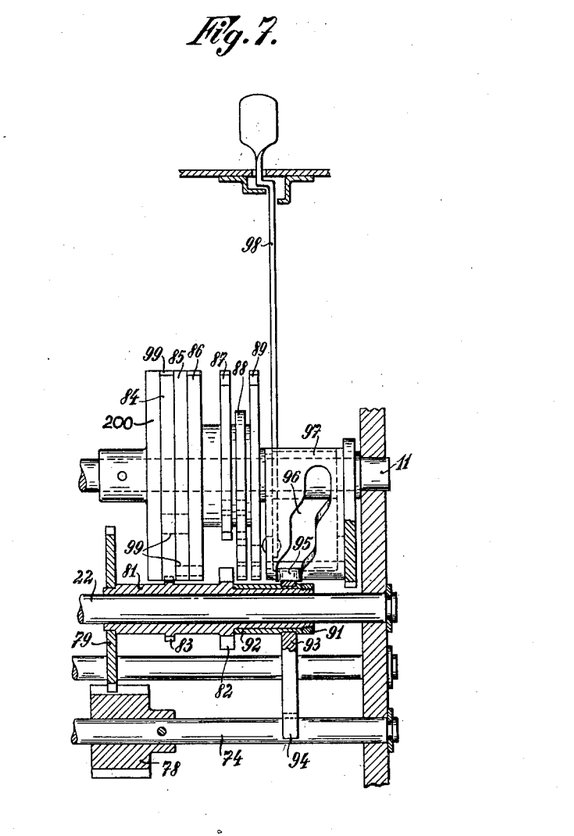
Figure 7 is a sectional view of a modified form of the transaction selecting lever and parts immediately connected thereto.

A fourth position of hand lever 98 and sleeve 81 may be provided as shown in Figure 7, in which position the pinion 83 co-operates with a locking disk 200 that has no recesses 99, and in which the pinion 82 is not in line with a toothed disk. In this case the totalizers would not be engaged at all during the operation of the machine, as is desired when an amount is to be printed and not added.

In the actual use of machines of this nature, the simultaneous selection of a totalizer in each of the four totalizer rows will occur very seldom, so that it becomes desirable to engage only those rows in which a totalizer is selected for operation, to save the superfluous rocking motion.

A modified construction to perform this function is illustrated in Figures 4a to 6. In this embodiment the shaft 72 associated with each row of totalizers is connected with the arm 75, rocked by the eccentric disk 77, by a disengageable clutch. This clutch causes a coupling of the arm 75 with the shaft 72 only if a totalizer in that particular row is selected for operation. This mechanism will now be described in detail.

Figure 4A:
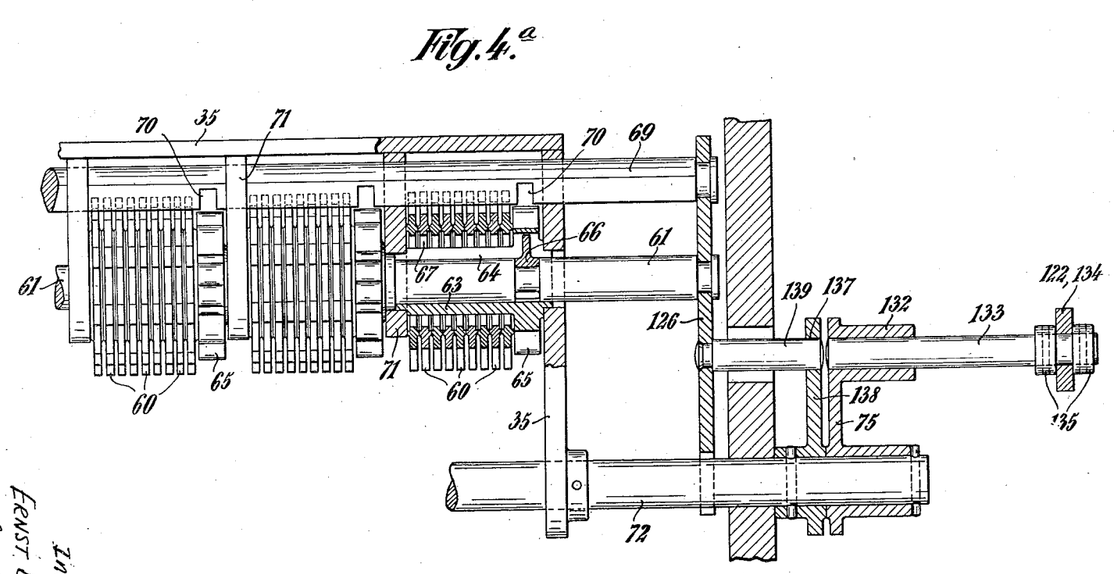
Figure 4a is a view, similar to Figure 4, of the modification shown in Figures 5 and 6.
Figure 5:
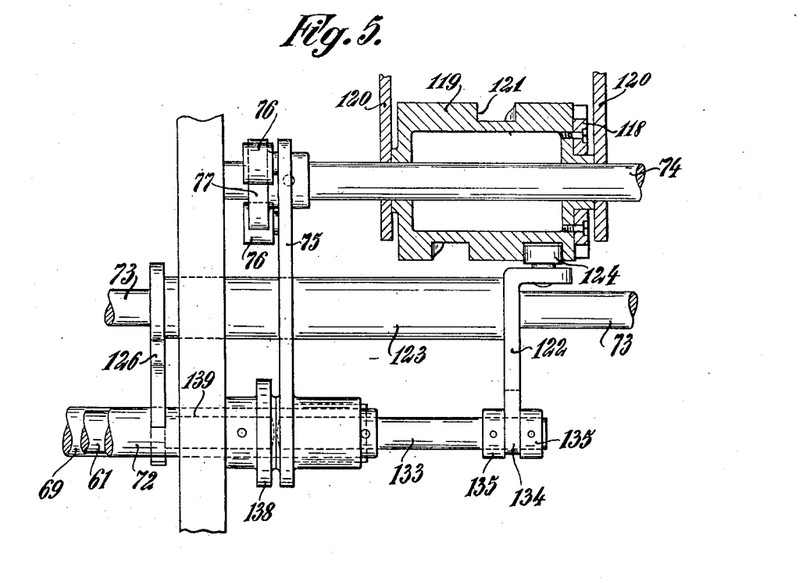
Figure 5 is a detail view of parts of the modified form of the totalizer selecting and engaging mechanism.
Figure 6:
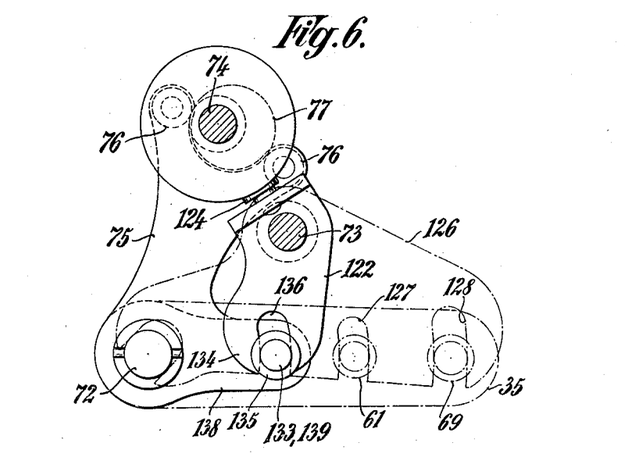
Figure 6 is a corresponding side view.

The arm 75 loosely mounted on shaft 72 carries a bolt 133, Figure 4a, displaceable in a sleeve 132, and held in lateral position by a prolongation 134 of the extension 122 and by two collars 135 secured to bolt 133. The prolongation 134 embraces the bolt 133 by means of an open slot 136, Figure 6, that enables the bolt 133 to rock about shaft 72.

When the sleeve 123 (Fig. 5) is shifted by the roller 124, the plate 126 that engages the rider axle 61 and locking bar 69, and the bolt 133 are shifted correspondingly, causing the bolt 133 to enter a bore 137 (Fig. 4a) in an arm 138 rigidly mounted on shaft 72. This causes the shaft 72 to be coupled with arm 75 so that whatever totalizer is selected by a shifting of the rider axle 61 will be connected with the actuating gears by a rocking of the totalizer frame when the eccentric 77 oscillates arm 75. It is obvious that unless a totalizer in this particular row is selected for operation, the arm 75 and shaft 72 will not be connected and the ensuing movement of the arm will not have the effect of connecting the totalizer for actuation. It is also obvious that when the plate 126 and extension 122 are returned to the position shown in Figure 4a, the bolt 133 will return to its position shown, where it does not connect arm 75 to shaft 72.

In order to prevent the totalizer assembly from being accidentally engaged, a bolt 139 is fixed on the plate 126 in alignment with bolt 133, which bolt 139 follows the bolt 133 into bore 137 of arm 138, as the bolt 133 leaves it. In this manner arm 138 and shaft 72, with which the totalizer frame 35 is rigidly connected, are rigidly connected with plate 126 which has no oscillating movement at any time.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, a totalizer, differentially actuated drive means therefor, a Geneva gear, driving means connected to said Geneva gear; a plurality of rotary means selectively locking said gear, each of said rotary means releasing said Geneva gear at different times in the rotation of said rotary means, to permit variously-timed rotary movements of said gear, and means controlled by the driving means connected to said gear for coupling the totalizer with the drive means.

2. In a machine of the class described, a totalizer, differentially actuated drive means therefor, a Geneva gear, a mounting member on which said gear is fixed, a plurality of means for selectively imparting variously-timed rotary movements to said member, means selectively co-operable with said gear to lock said member upon the completion of each of its rotary movements, and means controlled by said member for coupling the totalizer with the drive means.

3. In a machine of the class described, a totalizer, differentially actuated drive means therefor, a revoluble mounting member, a driven gear fixed on said member, a Geneva gear fixed on said member, a plurality of selectable drive members adapted to impart a differently timed intermittent movement to said driven gear, a plurality of locking members selectively co-operable with said Geneva gear to lock the latter between the movements of said driven gear, and means controlled by said revoluble mounting member for coupling the totalizer with the drive means.

4. Structure according to claim 1 wherein the rotary means are arranged on a common mounting member and the gear on another mounting member parallel thereto, and means are provided for axially shifting one of the mounting members relative to the other to effect selective engagement of said rotary means with said gear.

5. Structure according to claim 3 wherein the drive members are in the form of mutilated gears adapted to cooperate with said driven gear.

6. Structure according to claim 3 wherein the drive members and locking members are fixed on a common shaft.

7. Structure according to claim 3 wherein the drive members and locking members are arranged in equally spaced pairs on a common shaft.

8. Structure according to claim 3 wherein the drive members and locking members are arranged in equally spaced pairs on a common mounting member parallel to the mounting member for the gears, and means are provided for axially shifting one of the mounting members relative to the other to selectively engage the different pairs of drive and locking members with the gears.

9. Structure according to claim 1 wherein the rotary means are mounted on a common mounting member and the gear on another mounting member parallel thereto, and a drum having a stepped groove in which projects a follower is provided for axially shifting one of said mounting members relative to the other to effect selective engagement of said rotary means with said gear.

10. Structure according to claim 1 wherein the gear is axially shiftable relative to the rotary means to effect its selective engagement with the latter, and the coupling means is controlled through a drive gear in fixed connection with the Geneva gear to participate in the shifting movements of the latter and engaging a driven gear of sufficient width to maintain engagement with the drive gear in the various shifted positions of the latter.

11. Structure according to claim 1 wherein each rotary means is constructed to permit two angular movements of the gear 90 degrees each upon each operation of the machine whereby the coupling means are actuated to couple and uncouple the totalizer and the drive means.

12. In a machine of the class described, a totalizer, differentially actuated drive means therefor, a toothed Geneva gear, a plurality of substantially circular disks of similar size arranged on a shaft parallel to the gear axis, means for driving said gear, said disks each having a plurality of peripheral recesses differently spaced as regards the other disks, and means to shift said gear to selectively engage it with said disks, the recesses of the disks co-operating with the gear teeth to permit differently timed rotary movements of the gear, and means controlled by said gear for coupling the totalizer with the drive means.

13. Structure according to claim 12 wherein the drive means for the Geneva gear includes a plurality of mutilated gears operative only when the Geneva gear is released for rotation by the engagement of its teeth with the recesses of the disks.

14. Structure according to claim 12 wherein the drive means for the Geneva gear includes a plurality of mutilated gears mounted on the shaft and selectable simultaneously with the disks by axially shifting the gear.

15. Structure according to claim 12 wherein the disks are arranged in contact with each other and in the position of rest of the machine present aligned uninterrupted arcuate portions initially engageable by the Geneva gear upon shifting said gear.

16. In a machine of the class described, a group of totalizers having a plurality of orders of co-axially arranged number wheels, a differentially actuated drive member for the number wheels of each order of the totalizers, members adapted to be driven by each of said drive members and each selectively connectable with a number wheel of one of the orders of a totalizer, and means for relatively displacing said driving and driven members to engage and disengage them at each operation of the machine, said means being operable only in case said driven members have been connected with the wheels of a totalizer.

17. In a machine of the class described, a group of totalizers having a plurality of orders of co-axially arranged number wheels, a coaxial shaft longitudinally shiftable relative to said wheels, a differentially actuated drive member for the number wheels of each order of the totalizers, members on said shaft adapted to be driven by each of said drive members, means effective upon shifting of said shaft to couple a number wheel of each order of a selected totalizer to one of said driven members, means operable to relatively displace said driving and driven members to engage and disengage them at each operation of the machine, drive means for said displacing means, means for shifting said shaft, and coupling means for said driving and displacing means engaged upon actuation of said shifting means.

18. Structure according to claim 17 wherein the driven members are rockable into engagement with the drive members upon the rocking of a shaft which supports said driven members, and wherein the coupling means includes a pin parallel to the last-named shaft and longitudinally movable to effect the shifting of the first-named shaft.

19. In a machine of the class described, a group of totalizers having a plurality of orders, differentially actuated members therefor, a shaft in said group mounted for axial and transverse movement in the frame of the machine, means for axially shifting the shaft, a differential wheel for each order of said totalizers on said shaft, means for selectively coupling said wheel with the different totalizer wheels of the appurtenant order upon shifting said shaft, and means for moving said shaft transversely so as to bring the differential wheels into engagement with said differentially actuated members after the selective axially shifting movement of the shaft, if any, has been completed.

20. In a machine of the class described, driving means, a plurality of totalizers, differentially actuated members therefor, means for selecting one of the totalizers to be actuated, control means for setting said machine for adding, total-taking, and sub-total-taking operations, means actuated solely by said driving means for bringing the selected totalizer into and out of engagement with said differentially actuated members in differently timed movements to perform said addition and total-taking operations, connections between said selecting means and the driving means of the machine for operating said selecting means during adding operations, and means for actuating said selecting means directly by hand previous to the commencement of a total-taking operation.

21. In a machine of the class described, driving means, a totalizer arrangement comprising a totalizer axle adapted to receive a plurality of totalizers, differentially actuated members therefor, means for selecting a totalizer of said arrangement to be actuated, control means for setting said machine for adding, total-taking, and sub-total-taking operations, means actuated solely by the driving means for bringing the selected totalizer into and out of engagement with said differentially actuated members in differently timed movements to perform said addition and total-taking operations, connections between said selecting means and the driving means of the machine for operating said selecting means during adding operations, and means for actuating said selecting means directly by hand previous to the commencement of a total-taking operation.

22. The combination claimed in claim 20 wherein the direct hand actuated means for said selecting means includes a lever, a disk in connection with the totalizer selecting means, and means in connection with the lever and adapted to engage and move the disk upon operation of the lever.

23. The combination claimed in claim 20 wherein the selecting means for the totalizers is controlled upon addition through a bank of keys, and the direct hand operated actuating means for the selecting means includes a lever swingable in parallel relation to the bank of keys, the keys of said bank serving as indicating means for the selective positions of said lever.

24. In a machine of the class described, the combination of a totalizer; engaging means therefor, including a plurality of rotary means; a common mounting member therefor; a Geneva gear; another mounting member carrying said Geneva gear and parallel to the first member; and means for axially shifting one of the mounting members relatively to the other to effect selective engagement of the rotary means with the gear.

25. In a machine of the class described, the combination of a totalizer; differential drive means therefor; a revolvable mounting member; a driven gear fixed on the member; a Geneva gear fixed on the member; a plurality of selectable mutilated gears adapted to cooperate with said driven gear; a plurality of locking members selectively cooperable with the Geneva gear; and means controlled by the revolvable mounting member for coupling the totalizer with the drive means.

26. In a machine of the class described, the combination of a totalizer; differentially actuated driving means therefor; a revolvable mounting member; a driven gear carried by said member; a Geneva gear carried by said member; a plurality of selectable driving members adapted to cooperate with the driven gear; a plurality of locking members selectively cooperable with the Geneva gear; a shaft to which the drive members and the locking members are fixed; and means actuated by the revolvable mounting member for coupling the totalizer with the drive means.

27. In a machine of the class described, the combination of a totalizer; differentially actuated means therefor; a driven gear and Geneva gear carried by a common member; a plurality of drive members and locking members arranged in equally spaced pairs on a common shaft and adapted to cooperate with said driven gear and said Geneva gear respectively; and means controlled by the first mentioned common member for coupling the totalizer with the drive means as determined by said drive members.

28. In a machine of the class described, the combination of driving means; a plurality of totalizers; differentially actuated means therefor; control means for setting the machine for adding, total taking, and sub-total taking operations; means for selecting one of the totalizers to be actuated; means actuated by said driving means for engaging and disengaging the selected totalizer with the actuating means at different times, depending upon the control of the machine by said control means; a differential device for operating the selecting means during adding operations; means for actuating the selecting means by hand as a preliminary to a total taking operation for determining which totalizer is to be selected; and indicating means for controlling said differential device during adding operations and for indicating the position into which said hand operated means is to be moved to select a particular totalizer preliminary to a total taking operation.

29. In a machine of the class described adapted to perform adding and total taking operations, the combination of a plurality of totalizers; differential means for selecting a totalizer during adding operations; a manually operable member for selecting totalizers for total taking operations; and a plurality of manipulative devices for controlling said differential means for adding operations and to act as indicators for said manually operable device when the latter is used to select totalizers.

30. In a machine of the class described, a plurality of totalizers, differentially actuated members for selecting said totalizers for operation, amount differential members common to said totalizers, means for coupling said amount differential members with said totalizers to enter amounts in the latter and to take totals therefrom, means to actuate the coupling means in adding operations before the return movement of said members, means to actuate the coupling means in total taking operations before the forward movement of said members, a totalizer selector key associated with each of said totalizers for preparing the selection of said totalizers by said differentially actuated members for adding operations, and a totalizer selecting lever for directly selecting said totalizers before the operation of the machine for the taking of the totals therefrom.

31. In a machine of the class described adapted to perform adding and total taking operations, the combination of a plurality of totalizers in a single group, differential means for selecting a totalizer of said group during adding operations, a manually operable member for directly selecting any one of said totalizers prior to a total taking operation, and a plurality of manipulative devices for controlling said differential means during adding operation.

ERNST BREITLING.